UNITED STATES PATENT OFFICE.

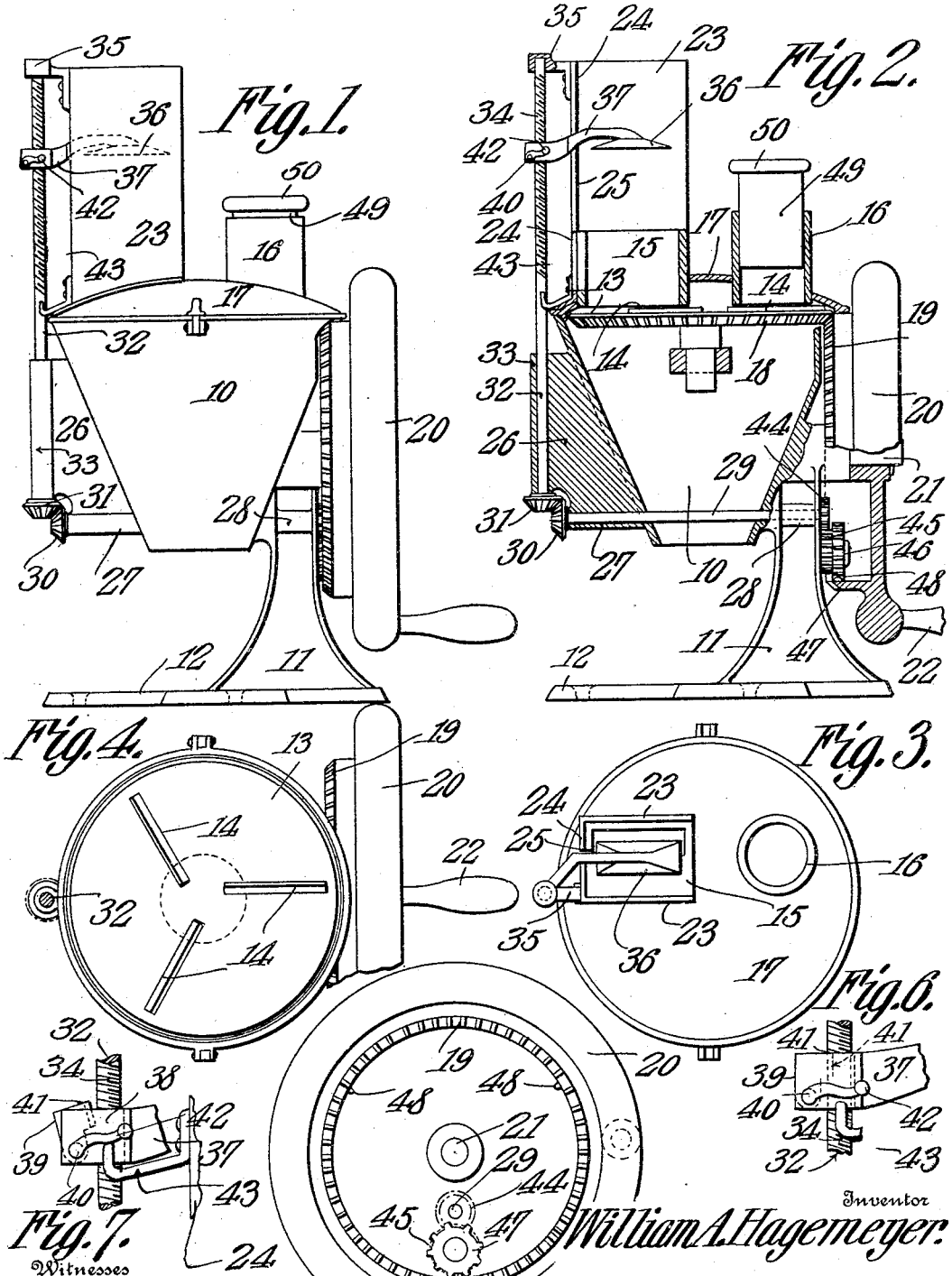

WILLIAM AUGUST HAGEMEYER, OF OLYMPIA, WASHINGTON.

ROTARY TOBACCO-CUTTER.

No. 931,295.  Specification of Letters Patent.  Patented Aug. 17, 1909.

Application filed November 24, 1908. Serial No. 464,272.

*To all whom it may concern:*

Be it known that I, WILLIAM AUGUST HAGEMEYER, a citizen of the United States, residing at Olympia, in the county of Thurston and State of Washington, have invented a new and useful Rotary Tobacco-Cutter, of which the following is a specification.

It is the primary object of the invention to provide a novel material feeding mechanism for tobacco and other similar cutting machines, which will operate to feed the material, not continuously, but as slices are cut therefrom. The advantage gained from the provision of such a feed mechanism, resides in the fact that the material is not firmly held against the cutter, and, consequently, will not, as in the case of plug tobacco, gum or clog the same.

It is a further object of the invention to provide, in addition to the means for automatically feeding the material as each slice is cut therefrom, means whereby a constant pressure is exerted upon the sliced or otherwise divided material, so that by successively performing the cutting operation, the material may be reduced or divided into particles of small size.

In the accompanying drawings:—Figure 1 is a view in elevation of the machine embodied in the invention; Fig. 2 is a vertical sectional view through the machine, taken in a line with the axis of the drive element thereof; Fig. 3 is a top plan view of the machine; Fig. 4 is a similar view, but with the cover removed. Fig. 5 is a detail view in elevation of the drive wheel of the machine, illustrating the means for imparting intermittent movement to the feed mechanism of the machine; Fig. 6 is a view in elevation and in detail of a portion of the feed mechanism of the machine, showing the parts in normal position; Fig. 7 is a view similar to Fig. 6, but showing the positions of the parts when the mechanism is rendered inoperative.

The body of the machine, as clearly illustrated in the drawings, is in the form of a hollow hopper-like body 10, supported by a standard, or pedestal 11, upon a base 12.
The body is preferably of inverted frusto-conical form, and mounted therein, at the upper end, is a rotary cutter disk 13, carrying blades 14, which are disposed radially of the disk and pass beneath a hopper 15 and a hopper 16, carried by a cover or top 17, disposed upon the main body 10 at its upper end; it being understood that these knives or blades 14 pass beneath the lower ends of the two hoppers, and, as shown in the drawings, the hoppers are located at substantially diametrically opposite points upon the cover 17. This cutter disk 13 has a toothed periphery 18, and meshes with a gear section 19, carried by a drive wheel 20. The drive wheel 20 just mentioned is rotatably mounted upon a stub-shaft 21 at the upper end of the standard 11 and carries a handle 22, by means of which it may be rotated, it being understood that rotation of the said drive wheel will result in rotation of the cutter disk 13, whereby the said disk may perform its functions.

The hopper 15 has removably disposed upon it an extension which is comprised of side walls 23 and a third or connecting wall 24, which is provided throughout the greater portion of its extent with a vertical slot 25. This extension 23 is placed upon the hopper 15 telescopically, and, as one side of the extension is entirely open, the plugs of tobacco, or other material to be cut, may be readily placed in position within the hopper 15.

The body 10 of the machine is formed with a laterally extending wing 26, formed at its lower edge with a bearing 27, in which and a similar bearing 28, adjacent the upper end of the standard 11, is journaled a shaft 29. This shaft 29 has, at its outer end, a beveled gear 30, which meshes with a similar gear 31, carried at the lower end of a shaft 32, this latter shaft being arranged vertically, and journaled for rotation in a bearing 33 formed at the vertical edge of the wing 26. From its upper end, to a point directly above the plane of the top 17 of the hopper 10, the shaft 32, last described, is threaded, as indicated by the numeral 34, the upper extremity of the shaft, however, being unthreaded and journaled in an inverted step bearing 35, carried at the upper end of the hopper extension 23 upon the connecting wall 24 thereof, and to one side of the slot 25 therein.

A follower plate 36 works vertically in the extension 23 of the hopper 15, and includes a stem 37, which projects through the slot 25 in the wall 24 of the said extension, and is provided, at its extremity, with a head 38, which is bifurcated or recessed to receive the shaft 34, the wall of the recess in the head being however plane. A block 39 is pivoted as at 40 in the recess in the head 38, and that face of the block which opposes the shaft 32 is formed with threads 41, which have a threaded engagement with the threaded portion 34 of the said shaft. Normally, the block seats with its threaded face in such engagement with the shaft, as shown in Fig. 6 of the drawings, so that when said shaft is properly rotated, the follower 36 will be fed downwardly. Upon the pivot 40 for the block 39, there is fixed an arm 42, which may be grasped and rocked, so as to move the block to position out of engagement with the threaded portion of the shaft, thereby permitting quick adjustment of the follower 36 in the extension of the hopper. It will thus be seen that rotation of the shaft is necessary in one direction only, and that, to feed the follower downwardly in the said extension of the hopper, and that when it is desired to raise the follower, so as to permit of the insertion of tobacco or other material into the hopper, the arm may be swung back, as above stated, and the follower lifted upwardly to the desired point upon the shaft 32. In order that the follower may be rendered inoperative when it has reached the limit of its downward movement, a finger 43 is fixed upon the wall 24 of the hopper extension 23, and this finger projects laterally and upwardly in the path of movement of the arm 42, so that when the follower has reached the downward limit of its movement, the said arm will be engaged, as illustrated in Fig. 7 of the drawings, and the block 39 will be swung out of engagement with the threaded portion of the shaft, further movement of the follower in a downward direction being, in this manner, obviated.

The shaft 29 carries, at its inner end, a pinion 44, which is in mesh with a pinion 45, upon a stub shaft 46, there being secured to this pinion 45, in any suitable manner, a pinion 47, which is designed to be intermittently rotated to rotate the shaft 29 in a corresponding manner, and, through the medium of this shaft 29, the shaft 32. The gear section 19 of the drive wheel 20 is in the nature of an annulus, and upon the inner periphery of the said section there are formed several lugs or teeth 48, which, during the rotation of the drive wheel 20, are designed to successively engage with the teeth of the gear 47, and intermittently rotate the same, as above stated. This rotation of the gear will result in the shaft 32 being rotated in a corresponding manner, and in the follower 36 being fed downwardly with a step-by-step movement. It will be observed that no means is provided for interrupting the movement of the follower and the shaft feeding the same, due to momentum gained from the impulse imparted thereto through the medium of the gear 47 and the gear teeth 48, and that therefore, the downward feed of the follower will not be in abrupt steps, but each step will commence with an abrupt initial movement, and will terminate gradually.

In the hopper 16, there is loosely arranged a follower 49, which is to be fed downwardly manually, and the follower is provided, at its upper end, with a head 50, which, when the follower has reached the limit of its downward movement, rests upon the upper edges of the walls of the said hopper, and prevents further movement of the follower.

From the foregoing description of my invention, it will be seen that when it is desired to cut plug tobacco into slices, the plugs are placed in the hopper 15, and the automatic feed employed solely; but, when it is desired to further grind the tobacco or other material, the slices produced by this method, the slices are placed in the hopper 16, and pressure exerted upon the follower 49, with one hand, while the cutter disk is rotated, through the medium of the drive wheel, with the other hand, this latter operation being repeated as often as is necessary reduces the material to the desired degree of division.

What is claimed is:—

1. In a machine of the class described, a base, knives rotating beneath the base, a receiving casing upon the base opening at its lower end therethrough, means for rotating said knives, a screw shaft, a follower, said follower having a head receiving said shaft, a block pivoted in the head and having a threaded shaft engaging face, an arm upon the block, a finger upon the wall of the receiving casing in the path of the movement of the arm upon the block in the head of the follower, said finger being arranged to engage with said arm whereby to shift the block from engagement with the shaft, means actuated by said knife rotating means for rotating said shaft, said follower having a range of movement the upper limit of which is below the upper end of the casing, said casing having a portion of one side open for the introduction of material thereinto.

2. In a machine of the class described, a base, knives rotating beneath the base, a receiving casing upon the base opening at its lower end therethrough, means for rotating said knives, a screw shaft, a follower, said follower having a head receiving said shaft, a block pivoted in the head and having a threaded shaft engaging face, an arm upon the block, a finger upon the wall of the receiving casing in the path of the movement of the arm upon the block in the head of the follower, said finger being arranged to engage with said arm whereby to shift the block from engagement with the shaft, means actuated by said knife rotating means for rotating said shaft, said follower having a range of movement the upper limit of which is below the upper end of the casing, said casing having a portion of one side open for the introduction of material thereinto, a second casing upon the base and opening at its lower end therethrough above the rotating knife, and a hand-actuated follower mounted in the said second receiving casing.

3. In a machine of the class described, a base, knives rotating beneath the base, a receiving casing upon the base comprising a lower section opening through the base, an upper section fitted upon the lower section and open at one side for the introduction of material thereinto, the last mentioned section being slotted vertically, a bearing carried by the said upper section, a feed shaft journaled at one end in said bearing, means for rotating the feed shaft, a follower having a body working in said receiving casing and having a stem projecting through the slot in the upper section of the receiving casing and a head at the end of the stem receiving said feed shaft, a block pivoted in the head and having a threaded shaft engaging face coöperating with said feed shaft, an arm carried by the block, and a finger projecting in the path of movement of said arm and arranged to engage with the same whereby to swing the block upon its pivot out of engagement with the feed shaft.

In testimony that I claim the foregoing as my own, I have hereto affixed my signature in the presence of two witnesses.

WILLIAM AUGUST HAGEMEYER.

Witnesses:
   C. HUTTON,
   WALTER CROSBY.